United States Patent
Honjo et al.

(10) Patent No.: US 7,828,375 B2
(45) Date of Patent: Nov. 9, 2010

(54) OUTER SLIDING SUNROOF APPARATUS

(75) Inventors: Yuuki Honjo, Sayama (JP); Yoshiki Noro, Wako (JP)

(73) Assignees: Honda Motor Co., Ltd., Tokyo (JP); Yachiyo Industry Co., Ltd., Sayama-shi (JP)

( * ) Notice: Subject to any disclaimer, the term of this patent is extended or adjusted under 35 U.S.C. 154(b) by 0 days.

(21) Appl. No.: 12/053,834

(22) Filed: Mar. 24, 2008

(65) Prior Publication Data

US 2008/0238154 A1  Oct. 2, 2008

(30) Foreign Application Priority Data

Mar. 28, 2007  (JP)  ............... 2007-084643

(51) Int. Cl.
  *B60J 7/02*  (2006.01)
(52) U.S. Cl. ................... 296/216.03; 296/223
(58) Field of Classification Search ............ 296/216.03, 296/216.05, 223
  See application file for complete search history.

(56) References Cited

U.S. PATENT DOCUMENTS

| 4,048,662 | A | * | 9/1977 | Burguburu | ................ 361/31 |
|---|---|---|---|---|---|
| 4,561,691 | A | * | 12/1985 | Kawai et al. | ........... 296/216.04 |
| 5,592,777 | A | * | 1/1997 | Petri et al. | ..................... 49/28 |
| 6,315,355 | B1 | * | 11/2001 | Lamm et al. | ................. 296/213 |
| 7,000,982 | B2 | * | 2/2006 | Kreiner et al. | ............... 296/223 |
| 7,004,538 | B2 | * | 2/2006 | Kitoh | .................... 296/216.02 |
| 7,015,669 | B2 | * | 3/2006 | Nagashima et al. | ......... 318/443 |
| 7,030,509 | B2 | * | 4/2006 | Okada et al. | ................ 307/10.1 |
| 7,073,291 | B2 | * | 7/2006 | Kawanobe et al. | ............. 49/26 |
| 7,252,328 | B2 | * | 8/2007 | Okada et al. | ................. 296/221 |
| 2005/0099037 | A1 | * | 5/2005 | Kitoh | ......................... 296/223 |
| 2007/0075570 | A1 | * | 4/2007 | Okada et al. | ........... 296/216.01 |

FOREIGN PATENT DOCUMENTS

| JP | 2003-129753 | 5/2003 |
|---|---|---|
| JP | 2004-084458 | 3/2004 |
| JP | 2005-290939 | 10/2005 |
| JP | 2006-327353 | 12/2006 |

\* cited by examiner

*Primary Examiner*—Dennis H Pedder
(74) *Attorney, Agent, or Firm*—Rankin, Hill & Clark LLP

(57) ABSTRACT

An outer sliding sunroof apparatus having a roof panel attached to an opening of a fixed roof of a vehicle, a drive device for opening and closing the roof panel, and a control unit for controlling the drive device. The apparatus further includes a load detector for detecting load applied to the drive device when the roof panel in a closed state is tilted up and moved toward a rear of the vehicle. When the load detector detects the load not less than a predetermined amount of load, the control unit is configured to move the roof panel in the closing direction.

5 Claims, 4 Drawing Sheets

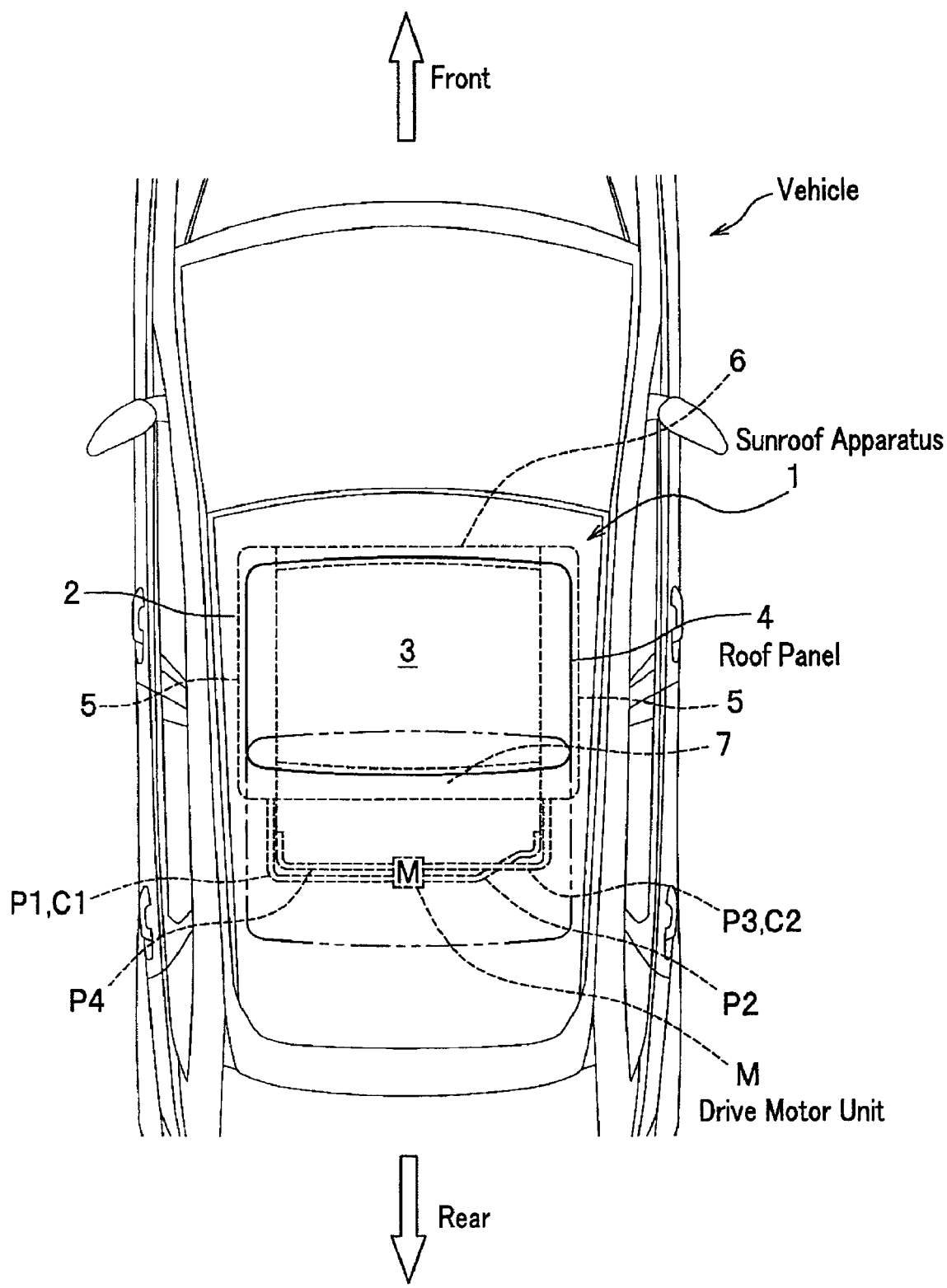

OUTER SLIDING SUNROOF APPARATUS

BACKGROUND OF THE INVENTION

1. Field of the Invention

The present invention relates to a sunroof apparatus of a vehicle.

2. Description of the Related Art

There exists a sunroof apparatus for a vehicle that includes a roof panel attached to an opening of a fixed roof, and a drive device for opening and closing the roof panel. In addition, a panel made of glass is used for the roof panel.

As an example of a sunroof apparatus, there exists an outer sliding sunroof apparatus configured so that a roof panel closes an opening of a fixed roof. When closed, the roof panel is tilted up and moves to the rear of the vehicle. The roof panel thereby opens above the fixed roof (for example, see paragraph 0021 and FIG. 3 in Japanese Patent Laid-Open Publication No. 2006-327353).

With respect to the outer sliding sunroof apparatus, when a carrier is attached to the fixed roof, or the vehicle enters a parking lot with a low ceiling, the roof panel, if opened, may be damaged. The damage is likely to result from the ceiling contacting the carrier or the roof. The contact results in pressure being applied to the roof panel from the carrier and the roof.

Furthermore, if the roof panel contacts the carrier and the ceiling during the opening operation of the panel, causing the panel to stop while the drive motor of the drive device is functioning, the drive motor may fail as a result of overload.

Consequently, there is a need for an outer sliding sunroof apparatus that can automatically reduce a load applied to a roof panel and a drive device when the roof panel contacts an external member such as a carrier and a ceiling during the opening operation of the panel.

SUMMARY OF THE INVENTION

The present invention relates to an outer sliding sunroof apparatus having a roof panel attached to an opening of a fixed roof of a vehicle, a drive device for opening and closing the roof panel, and a control unit for controlling the drive device. The apparatus further comprises a load detector configured to detect load applied to the drive device when the roof panel, in a closed state, is tilted up and moved toward a rear of the vehicle. Wherein, the control unit is configured to move the roof panel in a closing direction when the load detector detects a load not less than a predetermined load amount.

In accordance with the configuration, the roof panel during an opening operation contacts an external member such as a carrier and a ceiling and is pressed down, causing a load to be applied to the drive device. When the load applied to the drive device becomes not less than a predetermined amount, the roof panel moves in a closing direction, thereby automatically reducing the load applied to any of the roof panel and the drive device. Accordingly, it is possible to prevent damage to the roof panel and the overload state of the drive device.

In the outer sliding sunroof apparatus, the control unit is preferably set to not control the drive device, based on load detected by the load detector, while the roof panel is in a state of being tilted up contacts the opening of the fixed roof.

Here, when the roof panel starts or completes tilting upward, there exists a zone where any one of the front end and rear end of the roof panel is in contact with an edge of the opening of the fixed roof, and in the zone load applied to the drive device becomes larger. Furthermore, with respect to the outer sliding sunroof apparatus, in a case of a tilt operation of the roof panel being performed during running of the vehicle, when the roof panel starts or completes tilting up, a wind pressure acting on the roof panel becomes larger and the load applied to the drive device becomes larger.

Furthermore, while the roof panel, in a state of being tilted up, is in contact with the opening of the fixed roof, it is preferable to detect a moving speed of the roof panel and to control any one of the opening and closing operations of the roof panel based on the moving speed. Specifically, the moving speed of the roof panel is compared to a predetermined value: when the speed is not less than the predetermined value, the opening operation of the panel is continued because the panel is not in contact with an external member; when the speed is not more than the predetermined value, the closing operation of the panel is started because the panel is being pressed down and, therefore, in contact with the member.

While the roof panel, in a state of being tilted up, is in contact with the opening of the fixed roof, the moving speed of the roof panel is not stable. Therefore, when any one of the opening and closing operations is controlled based on an acceleration of the roof panel, the accuracy of controlling the opening and closing operations is reduced. Consequently, as described above, while the roof panel, in the state of being tilted up, is in contact with the opening of the fixed roof, any one of the opening and closing operations of the panel is controlled, based on the moving speed of the panel. Thereby, it is possible to accurately control the opening and closing operations of the panel.

In accordance with the outer sliding sunroof apparatus, the load detector may be configured to detect load applied to a drive motor which is a drive source of the drive device.

In accordance with this configuration, the load applied to the drive motor of the drive source is detected, and thereby, it is possible to easily detect the load applied to the drive device. Meanwhile, when the drive motor is an electric motor, it is possible to detect any one of a current and a voltage load passed through to the drive motor.

In accordance with the outer sliding sunroof apparatus, the control unit may be configured to detect a movement amount of the roof panel. A panel position in the closed state is set as an origin, and movement of the panel is detected based on a count value of a pulse generated on the basis of a rotation of the drive motor of the drive source of the drive device.

In accordance with this configuration, because the control unit may detect the position of the roof panel during any one of the opening and closing operations by detecting the movement amount of the panel, the unit may accurately control the opening and closing operations of the panel.

In accordance with the outer sliding sunroof apparatus of the present invention, it is possible to automatically reduce load applied to any of the roof panel and the drive device because the panel moves in the closing direction when the panel contacts an external member during its opening operation; and to prevent the damage of the panel and the overload state of the drive device.

BRIEF DESCRIPTION OF THE DRAWINGS

FIG. 1 is a plan view showing a sunroof apparatus of an embodiment of the present invention.

FIG. 2A is a side view of a state of the roof panel being fully closed; FIG. 2B is a side view of the roof panel in a state of being tilted up; and FIG. 2C is a side view of a state of the roof panel being sliding rearward.

BEST MODE FOR CARRYING OUT THE INVENTION

Figure 2A:
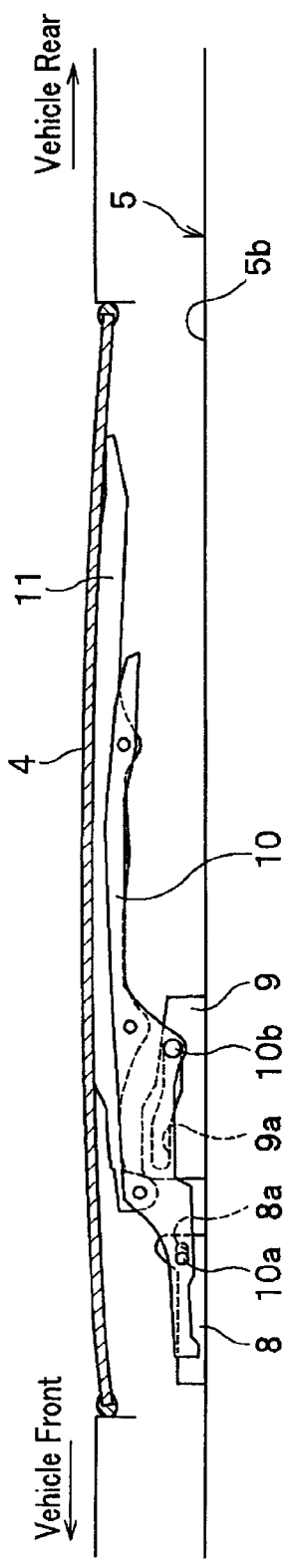
FIGS. 2A, 2B, and 2C are drawings showing opening and closing operations of a roof panel in the sunroof apparatus of the embodiment.

Next, an embodiment of the present invention will be described in detail with reference to drawings as needed.

The exemplary embodiment describes the present invention being applied to a fixed roof of a vehicle (automobile).

[General Configuration of Sunroof Apparatus]

An outer sliding sunroof apparatus 1 (hereinafter simply referred to as "sunroof apparatus") of the embodiment comprises, as shown in FIG. 1, a roof panel 4 loaded on an opening 3 of a fixed roof 2 of a vehicle; sliders 8, 9 (see FIGS. 2A, 2B, and 2C) attached to the roof panel 4 and sliding in a vehicle front-to-rear direction and thereby opening and closing the roof panel 4 in the vehicle front-to-rear direction; cables C1, C2 joined to the sliders 8, 9 and opening and closing the roof panel 4 by a push-pull operation; and guide frames 5, 5 having a guide frame rail 5b (see FIGS. 2A, 2B, and 2C) for guiding the sliders 8, 9 sliding.

<Configuration of Roof Panel>

The roof panel 4 is a panel made of glass and is configured so that: when the panel 4 is closed, it closes the opening 3 of the fixed roof 2; when the panel 4 is opened, it is tilted up by a tilt and slide mechanism described later and moved toward a vehicle rear Thereby, the panel 4 comes above the fixed roof 2 and is opened.

<Configuration of Drive Motor Unit>

At rear of the opening 3, a drive motor unit M is installed.

The drive motor unit M comprises an electric drive motor M1 (see FIG. 3) of a drive source, and a pinion gear (not shown) rotated by the motor M1.

<Configuration of Cable>

To both side edges of the roof panel 4 are respectively attached a pair of cables C1, C2 through the tilt and slide mechanism; the cables C1, C2 synchronously perform push-pull operations, and thereby are configured to open and close the roof panel 4 while keeping the posture of the roof panel 4 stable.

The cables C1, C2 are inserted in the drive motor unit M, and engage with a pinion gear (not shown) in the motor unit M, and thereby are configured to perform a push-pull drive.

Furthermore, in the cable C1 the drive motor unit M is made to be a boundary of the cable C1: one side thereof attached to one side edge (left in FIG. 1) of the roof panel 4 is inserted in a guide pipe P1 for guiding the cable C1; the opposite side is inserted in a guide pipe P2 for guiding a remaining length of the cable C1. Similarly, in the cable C2 one side thereof attached to the other side edge (right in FIG. 1) of the roof panel 4 is inserted in a guide pipe P3; the opposite side of the cable C2 is inserted in a guide pipe P4.

<Configuration of Guide Frame>

A pair of the left-right symmetric guide frames 5, 5 are attached to lower portions of both side edges of the opening 3 extendedly provided in the vehicle front-to-rear direction. Furthermore, a front frame 6 for joining a front end of each of the guide frames 5, 5 is provided at the lower portion of the front edge of the opening 3; a rear frame 7 for joining the rear end of each of the guide frames 5, 5 is provided at the lower portion of the rear edge of the opening 3.

<Configuration of Tilt and Slide Mechanism>

In the sunroof apparatus 1 the tilt and slide mechanism including a tilt mechanism and slide mechanism of the roof panel 4 is accommodated in each of the guide frames 5, 5. The tilt and slide mechanism comprises, as shown in FIG. 2A, the sliders 8, 9 (front slider 8 and rear slider 9) sliding in the vehicle front-to-rear direction in the guide frame rail 5b formed in each guide frame 5; and a panel support stay 10 of which an upper portion is attached to the roof panel 4 and of which a lower portion is attached to the front slider 8 and the rear slider 9. Thus the roof panel 4 is supported by the front slider 8 and the rear slider 9.

Meanwhile, because each tilt and slide mechanism accommodated in each guide frame 5 is an identical configuration, in the embodiment one tilt and slide mechanism will be described and the description of the other will be omitted.

The front slider 8 and the rear slider 9 respectively have cam holes 8a, 9a formed therein. Engagement pins 10a, 11a are formed in the panel support stay 10 for respectively engaging with the cam holes 8a, 9a.

Furthermore, the panel support stay 10 is attached to a lower face of a side edge of the roof panel 4 through a panel support bracket 11.

One end of the cable C1 or C2 is joined to the rear slider 9 for performing a push-pull operation, and is configured to slide in the vehicle front-to-rear direction along the guide frame rail 5b by the push-pull operation of the cable C1 (C2). Furthermore, in conjunction with the sliding of the rear slider 9, the panel support stay 10 and the front slider 8 are also adapted to slide in the vehicle front-to-rear direction.

<Opening and Closing Operations of Roof Panel>

Figure 2B:
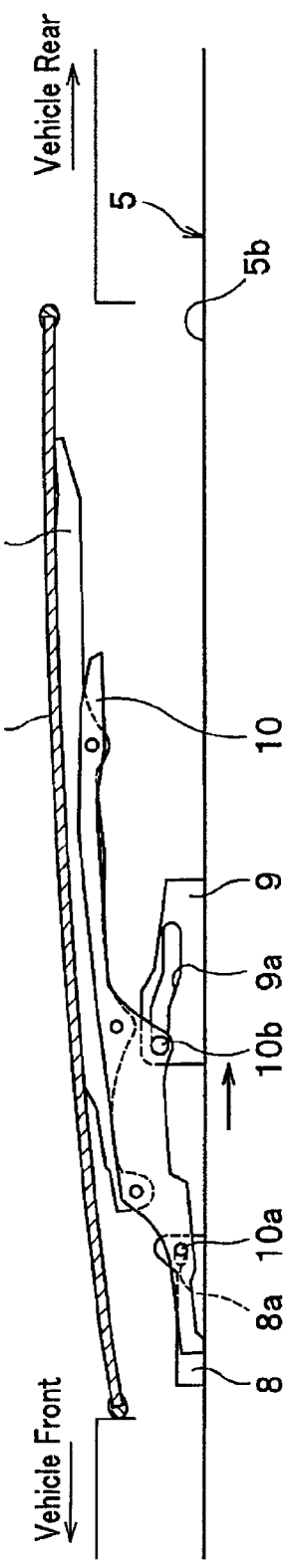

Next will be described the opening and closing operations of the roof panel 4 by the tilt and slide mechanisms. In FIG. 2A the roof panel 4 is in a state of being fully closed, and the front slider 8 and the rear slider 9 are respectively disposed at most forward positions. From this state, if the rear slider 9 slides slightly toward the vehicle rear by the cable C1 (C2), the engagement pins 10a, 10b of the panel support stay 10 move, as shown in FIG. 2B, within the cam holes 8a, 9a of the front slider 8 and the rear slider 9. Thereby, a rear side of the stay 10 is raised and tilted, and the roof panel 4 is tilted up.

Figure 2C:
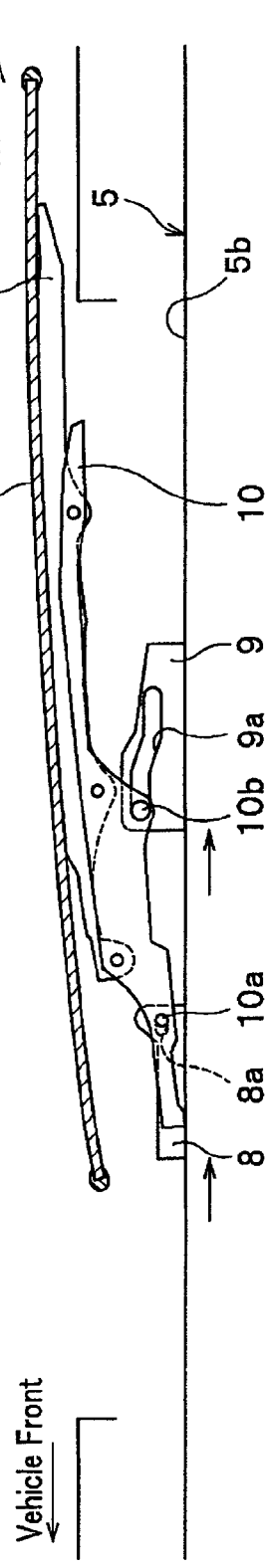

Moreover, from this state, if the rear slider 9 slides toward the vehicle rear, in conjunction with the slider 9 the front slider 8 joined to the rear slider 9 through the panel support stay 10 also slides, as shown in FIG. 2C, toward the vehicle rear, the rear side of the roof panel 4 comes above the fixed roof 2, and the roof panel 4 becomes in a state of being opened.

Meanwhile, because the closing operation of the roof panel 4 is reversely performed in the above opening operation, a description thereof will be omitted.

Meanwhile, when the roof panel 4 starts or completes to tilt up (see FIG. 2B), there exists a zone (hereinafter referred to as "mask area") where any of the front end and rear end of the panel 4 is in contact with the edge of the opening 3 of the fixed roof 2.

<Configuration of Control Mechanism>

The sunroof apparatus 1 of the embodiment comprises a control mechanism configured to control the opening and closing operations.

Figure 3:
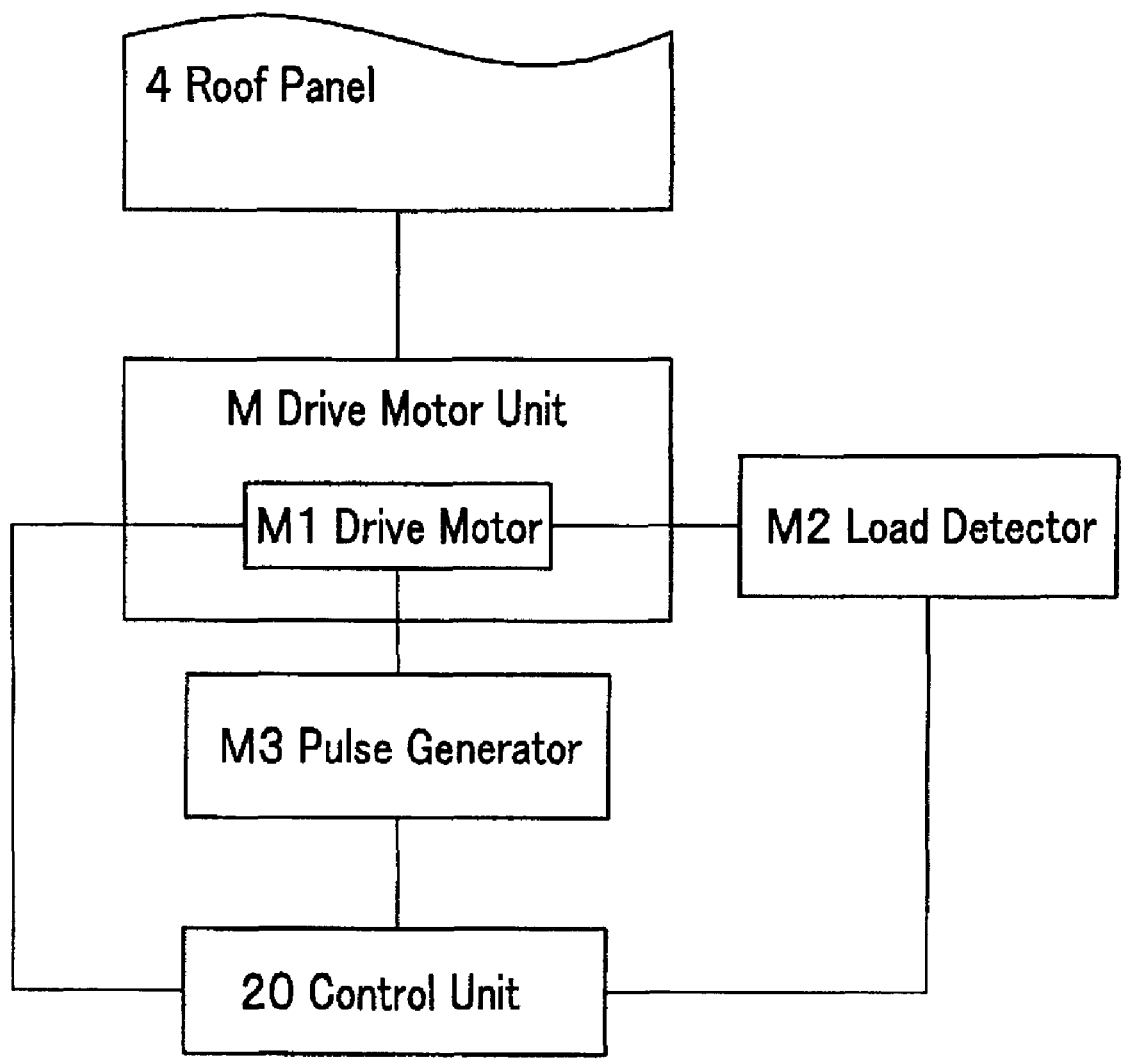
FIG. 3 is a block diagram showing a control mechanism for controlling the opening and closing operations of the roof panel in the sunroof apparatus of the embodiment.

The control mechanism comprises, as shown in FIG. 3, a control unit 20 configured to control the drive motor M1 of the drive source of the drive motor unit M; a load detector M2 configured to detect load applied to the motor M1; and a pulse generator M3 configured to generate a pulse based on a rotation of an output shaft (not shown) of the motor M1. Meanwhile, the load detector M2 detects a current amount applied to the motor M1 as load.

The control unit 20 comprises, for example, a CPU (Central Processing Unit), a RAM (Random Access Memory), a ROM (Read Only Memory), and an input circuit. The control unit 20 controls each calculation processing based on an input from any of the load detector M2, the pulse generator M3, and any of a program and data memorized in the ROM. Thereby, the control unit 20 performs the control. The control unit 20 detects a movement amount of the roof panel 4, making a position of the roof panel 4 in a closed state an origin based on a count value of a pulse generated by the pulse generator M3.

In a case of the load detector M2 detecting load (current amount) not less than a predetermined amount, when the control unit 20 tilts up the roof panel 4 in the closed state and moves it toward the rear of the vehicle, the control unit 20 controls the drive motor M1 so as to move the panel 4 in the closing direction.

Here, when the roof panel 4 contacts an external member such as a carrier and a ceiling, the external member presses down and applies pressure on the panel 4 as the panel attempts to move in the opening direction As the drive motor M1 attempts to move the roof panel 4 in the opening direction, the roof panel 4 resists the pressure applied to the panel 4, and the load applied to the motor M1 becomes larger.

Accordingly, when the roof panel 4 contacts an external member and a load applied to the drive motor M1 becomes not less than a predetermined amount, the control unit 20 is configured to start the closing operation of the panel 4.

Furthermore, when the load detector M2 detects a load not less than a predetermined value, the control unit 20 detects whether or not the roof panel 4 is positioned at the mask area. When the position of the roof panel 4 is at the mask area, the control unit 20 is set to not control the drive motor M1 based on the load detected by the load detector M2.

Here, because at the mask area any of the front end and rear end of the roof panel 4 is in contact with the edge of the opening 3 of the fixed roof 2, load applied to the drive motor M1 becomes larger. Furthermore, when the roof panel 4 is tilted up during running of the vehicle, a wind pressure acting on an outer face of the panel 4 becomes larger; when the roof panel 4 is tilted down during running of the vehicle, because an upward wind pressure acts on the panel 4 due to air sucked out from the inside of the vehicle, load applied to the drive motor M1 becomes larger at the mask area. Accordingly, when the load detector M2 detects load applied to the drive motor M1 at the mask area, the load may exceed a predetermined amount set in advance, and there is a fear that the control unit 20 moves the roof panel 4 in the closing direction in spite of the panel 4 being normally tilted up. That is, in the drive motor unit M an erroneous operation may be caused.

When the position of the roof panel 4 is at the mask area, the control unit 20 detects a movement amount of the panel 4 per unit time, and then detects a moving speed of the panel 4, and determines whether or not the moving speed is not more than a predetermined value.

When the moving speed of the roof panel 4 is not less than a predetermined value, because the panel 4 is not in a state of being in contact with an external member, the control unit 20 continues the opening operation of the panel 4.

On the other hand, when the moving speed of the roof panel 4 is not more than a predetermined value, because the panel 4 is in a state of being pressed down and in contact with an external member at the mask area, the control unit 20 starts the closing operation of the panel 4.

Here, because a moving speed of the roof panel 4 is not stable, the control unit 20 detects whether or not the panel 4 is in contact with an external member based on a movement amount of the panel 4 per unit time. Thereby, the control unit 20 may accurately control the opening and closing operations of the panel 4.

Furthermore, when the position of the roof panel 4 is not at the mask area, the control unit 20 determines whether or not an acceleration of the panel 4 is not more than a predetermined value.

When the position of the roof panel 4 is not more than a predetermined value because the panel 4 is in a state of being pressed down by an external member, the control unit 20 starts the closing operation of the panel 4.

When the position of the roof panel 4 is not at the mask area, the control unit 20 determines whether or not an acceleration of the panel 4 is not more than a predetermined value.

On the other hand, when the acceleration of the roof panel 4 is not more than a predetermined value because the control unit 20 detects a movement amount of the panel 4 per unit time, and then detects a moving speed of the panel 4, and determines whether or not the moving speed of the panel 4 is not more than a predetermined value.

Then, when the moving speed of the roof panel 4 is not less than the predetermined value because the panel 4 is not in a state of being in contact with an external member, the control unit 20 continues the opening operation of the panel 4.

Furthermore, when the moving speed of the roof panel 4 is not more than a predetermined value because the panel 4 is in a state of being pressed down by an external member, the control unit 20 starts the closing operation of the panel 4.

Furthermore, after the control unit 20 starts the closing operation, the control unit 20 detects a movement amount of the panel 4 per unit time, detects a moving speed of the panel 4, and determines whether or not the moving speed of the panel 4 is not more than a predetermined value.

When the moving speed of the roof panel 4 is not more than a predetermined value, the control unit 20 determines that the panel 4 has contacted another member between the edge of the fixed roof 2 and itself, and completes the closing operation of the panel 4.

Furthermore, when the moving speed of the roof panel 4 is not less than a predetermined value, the control unit 20 completes the closing operation of the panel 4 at a time when the panel 4 moves by a predetermined amount. Meanwhile, the roof panel 4 is preferably prevented from moving in the closing direction more than necessary by making a movement amount for completing the closing operation of the panel 4 not more than 10 mm.

Next, a control of the roof panel 4 will be described when the roof panel is contacting an external member during the closing operation thereof. The flowchart of FIG. 4 will be referred as needed.

First, when the opening operation of the roof panel 4 shown in FIG. 1 is started (step S1), the load detector M2 shown in FIG. 3 detects load (current amount) applied to the drive motor M1.

The control unit 20 determines whether or not the load detected by the load detector M2 is not less than a predetermined amount (step S2): when the load is not more than the predetermined amount (No in the step S2), the unit 20 continues the opening operation of the panel 4. Thus when the roof panel 4 is not in contact with an external member, the opening operation of the panel 4 is continued and the opening 3 (see FIG. 1) becomes in a state of being opened.

When the load detected by the load detector M2 is not less than the predetermined amount (Yes in the step S2), the control unit 20 determines whether or not a position of the roof panel 4 is at the mask area, based on the movement amount of the panel 4 (step S3).

When the position of the roof panel 4 is at the mask area (Yes in the step S3), the control unit 20 determines whether or not a moving speed of the panel 4 is not more than a predetermined value (step S4).

When the moving speed of the panel 4 is not less than the predetermined value (No in the step S4), the control unit 20 continues the opening operation of the panel 4. Thus the opening operation of the panel 4 is continued and the opening 3 (see FIG. 1) becomes in a state of being opened.

Furthermore, if the moving speed of the roof panel 4 is not more than the predetermined value (Yes in the step 4), the control unit 20 starts the closing operation of the panel 4 (step S6). Thus when the roof panel 4 contacts an external member at the mask area, the closing operation of the panel 4 is started.

Furthermore, when the position of the roof panel 4 is not at the mask area, the control unit 20 determines whether or not an acceleration of the panel 4 is not more than a predetermined value (step S5).

When the acceleration of the roof panel 4 is not more than the predetermined value (Yes in the step S5), the control unit 20 starts the closing operation of the panel 4 (step S6). Thus when the roof panel 4 contacts an external member at other than the mask area, the closing operation of the panel 4 is started.

Furthermore, when the acceleration of the roof panel 4 is not less than the predetermined value (No in the step S5), the control unit 20 detects the moving speed of the panel 4 and determines whether or not the moving speed of the panel 4 is not more than the predetermined value (step S4).

When the moving speed of the roof panel 4 is not less than the predetermined value (No in the step S4), the control unit 20 continues the opening operation of the panel 4. Thus the opening operation of the roof panel 4 is continued and the opening 3 (see FIG. 1) becomes in the state of being opened.

Furthermore, when the moving speed of the roof panel 4 is not more than the predetermined value (Yes in the step S4), the control unit 20 starts the closing operation (step S6). Thus when the roof panel 4 contacts an external member at other than the mask area, the closing operation of the panel 4 is started.

Here, when the acceleration of the roof panel 4 is not more than the predetermined value, the control unit 20 immediately starts the closing operation of the panel 4; therefore, compared to a case of the acceleration of the panel 4 being not less than the predetermined value, processing performed by the unit 20 for starting the closing operation of the panel 4 is less, and thus the closing operation of the panel 4 is started at an earlier timing.

When the closing operation of the roof panel 4 is started (step S6), the control unit 20 detects the position of the panel 4 per unit time and determines whether or not a movement amount of the panel 4 is not more than a predetermined amount (step S7).

Then, when the movement amount of the roof panel 4 is not more than the predetermined amount (Yes in the step S7), the control unit 20 determines that the panel 4 has contacted another member between an edge of the fixed roof 2 (see FIG. 1) and itself, and completes the closing operation of the panel 4 (step S9).

Furthermore, when the movement amount of the roof panel 4 is not less than the predetermined amount (No in the step S7), the control unit 20 determines whether or not the panel 4 has moved by the predetermined amount in the closing direction (step S8); when the panel 4 had moved by the predetermined amount in the closing direction (Yes in the step S8), the control unit 20 completes the closing operation of the panel 4 (step S9).

Furthermore, if the roof panel 4 has not moved by the predetermined amount in the closing direction (No in the step S8), the control unit 20 continues the closing operation of the panel 4.

[Action and Effect of Sunroof Apparatus]

In accordance with the sunroof apparatus 1 described above, when the roof panel 4 during the opening operation thereof as shown in FIG. 2B contacts an external member such as a carrier and a ceiling, and load (current amount) applied to the drive motor M1 of the drive motor unit M (see FIG. 3) becomes a predetermined amount, the panel 4 is configured to move in the closing direction. Therefore, it is possible to automatically reduce load applied to any of the roof panel 4 and the drive motor unit M, and the damage of the panel 4 and the overload state of the motor unit M may be prevented.

Furthermore, when the roof panel 4 is in a state of being tilted up, the control unit 20 does not control the drive motor M1 (see FIG. 3) at the mask area where the panel 4 is in contact with the opening 3 of the fixed roof 2 based on load detected by the load detector M2 (see FIG. 3); therefore, when the panel 4 is in a state of being normally tilted up, it is possible to prevent the panel 4 from being closed by the drive motor unit M erroneously operating.

Moreover, it is possible to accurately control any one of the opening and closing operations of the roof panel 4 because the control unit 20 may detect the position of the panel 4 during the opening and closing operations, making the position of the panel 4 in the closed state an origin based on the count value of a pulse generated on the basis of the rotation of the drive motor M1.

While an embodiment of the present invention has been described, the invention is not limited thereto and can be modified in design as needed within the spirit and scope of the invention.

For example, in the embodiment, load (current amount) applied to the drive motor of M1 of the drive motor unit M shown in FIG. 3 is detected, and thereby, the load applied to the motor unit M is easily detected; however, as the configuration of detecting the load applied to the motor unit M, it is available to detect as load any one of a voltage applied to the drive motor M1, and a torque of an output shaft of the motor M1, and so the configuration is not limited.

Figure 4:
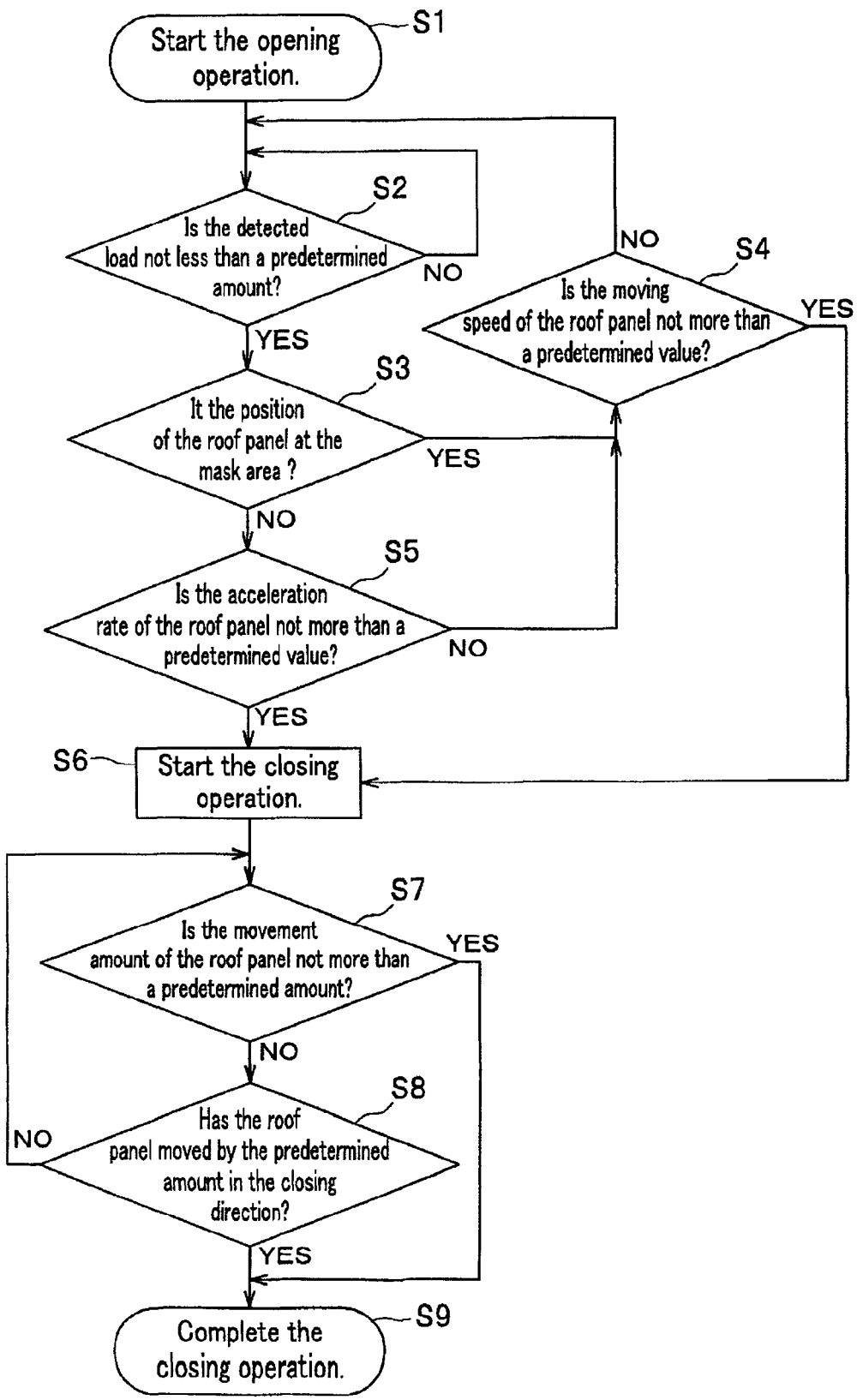
FIG. 4 is a flowchart showing a control in the sunroof apparatus of the embodiment when the roof panel during the opening operation contacts an external member.

Furthermore, in accordance with the control unit 20 of the embodiment, as shown in FIG. 4, when the load detected by the load detector M2 is not less than a predetermined amount (step S2), the control unit 20 determines whether or not the position of the roof panel 4 is at the mask area (step S3); however, when the load detected by the load detector M2 is not less than the predetermined amount, the unit 20 may be configured to start the opening operation of the panel 4 without determining whether or not the position of the panel 4 is at the mask area.

What is claimed is:

1. An outer sliding sunroof apparatus having a roof panel configured to be attached to an opening of a fixed roof of a vehicle, a drive device configured to open and close the roof panel, and a control unit configured to control the drive device, the apparatus further comprising:

a load detector configured to detect load applied to the drive device when the roof panel in a closed state is tilted up and moved toward a rear of the vehicle, wherein when the load detector detects the load to be greater than or equal to a predetermined amount, the control unit is configured to move the roof panel in a closing direction, and wherein while the roof panel is in a state of being tilted up and in contact with the fixed roof, the control unit is set not to control the drive device, based on the load detected by the load detector.

2. The outer sliding sunroof apparatus according to claim 1, wherein the load detector is configured to detect load applied to a drive motor which is a drive source of the drive device.

3. The outer sliding sunroof apparatus according to claim 1, wherein the control unit is configured to detect a movement amount of the roof panel, making a position of the roof panel in the closed state an origin, based on a count value of a pulse generated on a basis of a rotation of a drive motor which is a drive source of the drive device.

4. The outer sliding sunroof apparatus according to claim 1, further comprising a roof panel speed detector, wherein while the roof panel is in a state of being tilted up, when a speed of the roof panel is detected to be equal to or smaller than a predetermined value by the roof panel speed detector, the control unit is configured to move the roof panel in the closing direction, based on the detection.

5. The outer sliding sunroof apparatus according to claim 1, wherein the load detector is configured to detect a load applied as a downward pressing load of the roof panel.

* * * * *